US009987739B2

(12) United States Patent
Frascello

(10) Patent No.: US 9,987,739 B2
(45) Date of Patent: Jun. 5, 2018

(54) APPARATUS FOR SLIDING AUXILIARY HANDLE

(71) Applicant: Anthony F. Frascello, Phoenix, AZ (US)

(72) Inventor: Anthony F. Frascello, Phoenix, AZ (US)

( * ) Notice: Subject to any disclaimer, the term of this patent is extended or adjusted under 35 U.S.C. 154(b) by 0 days. days.

(21) Appl. No.: 14/770,965

(22) PCT Filed: Mar. 14, 2014

(86) PCT No.: PCT/US2014/029510
§ 371 (c)(1),
(2) Date: Aug. 27, 2015

(87) PCT Pub. No.: WO2014/144910
PCT Pub. Date: Sep. 18, 2014

(65) Prior Publication Data

US 2016/0001437 A1 Jan. 7, 2016

Related U.S. Application Data

(60) Provisional application No. 61/800,454, filed on Mar. 15, 2013.

(51) Int. Cl.
*B25G 1/00* (2006.01)
*B25G 1/06* (2006.01)
(Continued)

(52) U.S. Cl.
CPC ............... *B25G 1/002* (2013.01); *B25G 1/06* (2013.01); *B25G 1/10* (2013.01); *B25G 3/00* (2013.01); *B25G 3/10* (2013.01); *Y10T 16/469* (2015.01)

(58) Field of Classification Search
CPC ... Y10T 16/44; Y10T 16/469; Y10T 16/4713; Y10T 16/498; B25G 1/002; B25G 1/06;
(Continued)

(56) References Cited

U.S. PATENT DOCUMENTS 3,466,078 A * 9/1969 Sholund .................. A01B 1/22
16/426
5,474,350 A 12/1995 Gauthier
(Continued)

FOREIGN PATENT DOCUMENTS

GB 2354731 4/2001
WO WO9117647 11/1991
(Continued)

*Primary Examiner* — William Miller
(74) *Attorney, Agent, or Firm* — Michelle L. Gross, P.C.

(57) ABSTRACT

An apparatus is provided for mounting to a work tool shaft to facilitate and reduce stress in the use of the tool. The apparatus includes a mounting portion adapted for receiving the work tool shaft and a handle mounted to the mounting portion. The handle includes an elongated portion offset from the work tool shaft and adapted for gripping by a user of the tool. The handle elongated portion is disposed, at least in part, intermediate the mounting portion and the work tool head and is substantially in line with the tool shaft. The mounting portion is adapted so that it can slide along the work tool shaft when no leverage is exerted on the handle and can firmly hold the work tool shaft when leverage is exerted on the handle. An adjustment assembly is provided for adjusting the sliding resistance of the mounting portion on the work tool shaft. A brake is adapted to hold the mounting portion in a fixed position along the length of the work tool shaft when leverage is applied to the handle and to allow the mounting portion to move along the length of the work tool shaft when the leverage is removed.

20 Claims, 14 Drawing Sheets

(51) Int. Cl.

| | |
|---|---|
| ***B25G 3/00*** | (2006.01) |
| ***B25G 1/10*** | (2006.01) |
| ***B25G 3/10*** | (2006.01) |

(58) Field of Classification Search

CPC .... B25G 1/10; B25G 3/00; B25G 3/10; A01B 1/026

USPC ..... 16/110.1, 422, 426, 436; 15/145; 294/58

See application file for complete search history.

(56) References Cited

U.S. PATENT DOCUMENTS

| | | | | |
|---|---|---|---|---|
| 5,594,975 | A | 1/1997 | Christen | |
| 6,360,402 | B1 * | 3/2002 | Crabtree | A45C 13/00 16/422 |
| 6,798,348 | B1 | 9/2004 | Wilker | |
| 7,014,232 | B2 * | 3/2006 | Bosa | A01B 1/026 16/426 |
| 7,374,319 | B2 * | 5/2008 | Camarota | A47K 3/003 16/110.1 |
| 7,971,914 | B1 | 7/2011 | Pladson | |
| 8,667,648 | B2 * | 3/2014 | Vierck | A01D 34/416 16/422 |
| 8,893,355 | B2 * | 11/2014 | Longley | B25G 1/00 16/426 |
| 2003/0057721 | A1 | 3/2003 | Ducklow | |
| 2005/0011051 | A1 | 1/2005 | Bosa | |
| 2011/0173778 | A1 * | 7/2011 | Wales | B25G 3/20 16/426 |

FOREIGN PATENT DOCUMENTS

| | | |
|---|---|---|
| WO | WO2004018157 | 3/2004 |
| WO | WO2008070903 | 6/2008 |
| WO | WO2011050349 | 4/2011 |

* cited by examiner

APPARATUS FOR SLIDING AUXILIARY HANDLE

RELATED APPLICATION

This application claims the benefit of U.S. Provisional Application No. 61/800,454, filed Mar. 15, 2013, entitled "Apparatus for Sliding Auxiliary Handle," which is incorporated herein by reference.

BACKGROUND

This invention relates generally to work tools. More particularly, it relates to a sliding auxiliary handle that can be easily and quickly mounted on a conventional shaft-like handle of a work tool (such as a shovel or a string trimmer) or a structure (such as a handrail) so that a user may work with the tool in a more efficient and ergonomic manner.

Various types of work tools have a tool portion or head and a shaft that is formed in a generally cylindrical configuration for easy gripping. Examples of such implements are hoes, rakes, shovels, spades, snow shovels and so on. Most of these tools are used in the moving or lifting of materials such as soil, sand or snow, which can require substantial effort from an average person to move.

The effort used in moving and lifting such material can cause physical strain symptomized by back and shoulder aches. Such strain results because, in moving a work tool such as a snow shovel forward, or lifting the snow with the shovel, it is usually required that one hand of the operator be placed adjacent the distal or upward end of the shaft, while the other hand is placed toward the middle or lower portion of the handle. This positioning is required in order to gain sufficient leverage to lift or move the weight carried by the tool portion. In so placing the hands, however, the weight of the material on the tool portion is transferred through the arms and into the shoulders while the lower back portion of the operator is severely bent. This is, at the least, uncomfortable, and may often produce severe fatigue and strain in the back area and serious medical problems.

Accordingly, it is an object of the present invention to provide an apparatus that can be easily mounted on the shaft of a conventional work tool and which can provide improved ergonomics to reduce the physical strain and stress on the tool user.

It is another object of the invention to provide such an apparatus that can be easily moved to a different position along the length of the work tool shaft to the most advantageous position for the particular user, tool and task.

It is another object of this invention to provide such an apparatus that can be easily transferred from the shaft of one tool to another.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in this specification, including the appended claims.

SUMMARY

To achieve the foregoing objects, and in accordance with the purposes of the invention as embodied and broadly described in this document, there is provided an apparatus for mounting to a work tool shaft to facilitate and reduce stress in the use of the tool. The apparatus includes a mounting portion adapted for receiving the work tool shaft and a handle mounted to the mounting portion. The handle includes an elongated portion offset from the work tool shaft and adapted for gripping by a user of the tool. In some embodiments, the handle elongated portion is disposed, at least in part, intermediate the mounting portion and the work tool head and is substantially in line with the tool shaft. The mounting portion is adapted so that it can slide along the work tool shaft when no leverage is exerted on the handle and can firmly hold the work tool shaft when leverage is exerted on the handle. The apparatus can include adjustment means for adjusting the sliding resistance of the mounting portion on the work tool shaft. The adjustment means can include a screw for tightening the mounting around the work tool shaft.

In some embodiments, the mounting portion has a generally cylindrical opening for receiving the work tool shaft and for allowing the mounting portion to be slidingly moved along a length of the work tool shaft. The opening can include an interior surface adapted for allowing the mounting portion to be moved along the work tool shaft. A sliding pad can be disposed within the cylindrical opening of the mounting portion. The mounting portion can comprise a sleeve having a lengthwise slot. In other embodiments, the mounting portion can comprise a clamshell structure.

In some embodiments, a brake is adapted to hold the mounting portion in a fixed position along the length of the work tool shaft when leverage is applied to the handle and to allow the mounting portion to move along the length of the work tool shaft when the leverage is removed.

In some embodiments, the brake can include a brake pad disposed within the cylindrical opening of the mounting portion. The brake can include a rocker assembly pivotably mounted to the mounting portion and configured to cause a brake pad to engage the work tool shaft when the handle is pivoted in a first direction and to disengage from the work tool shaft when the handle is pivoted in a second, opposite direction.

BRIEF DESCRIPTION OF THE DRAWINGS

The accompanying drawings, which are incorporated in and constitute a part of the specification, illustrate the presently preferred embodiments and methods of the invention and, together with the general description given above and the detailed description of the preferred embodiments and methods given below, serve to explain the principles of the invention.

DESCRIPTION

Reference in this application is made to presently preferred embodiments of the invention. While the invention is described more fully with reference to these examples, the invention in its broader aspects is not limited to the specific details, representative devices, and illustrative examples shown and described. Rather, the description is to be understood as a broad, teaching disclosure directed to persons of ordinary skill in the appropriate arts, and not as limiting upon the invention.

Figure 1:
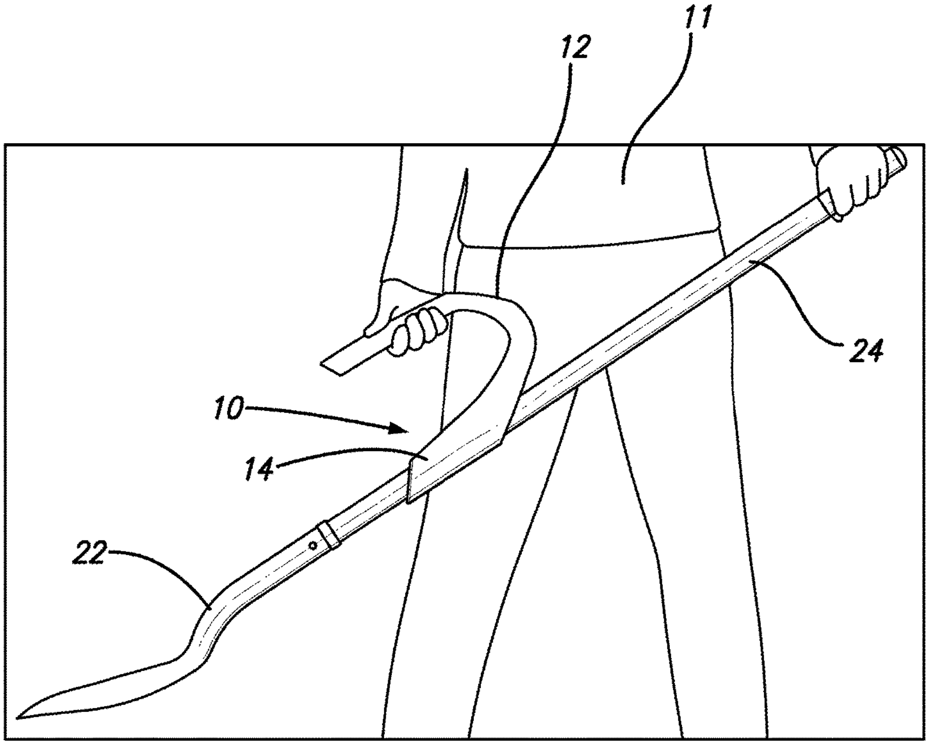
FIG. 1 shows one embodiment of an apparatus according to the present invention mounted to the shaft of a shovel and being gripped by a user.
Figure 2A:
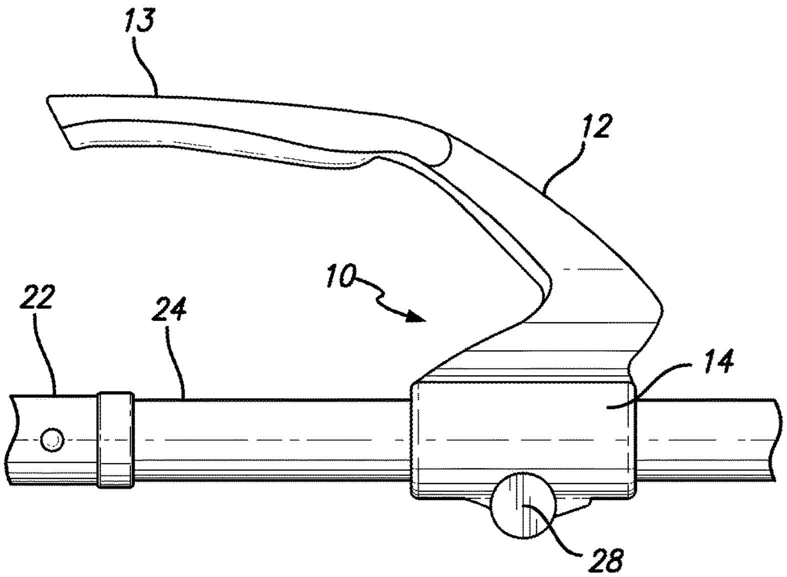
FIG. 2A is a side elevation view of another embodiment of an apparatus according to the present invention, showing the apparatus mounted on a tool shaft.
Figure 2B:
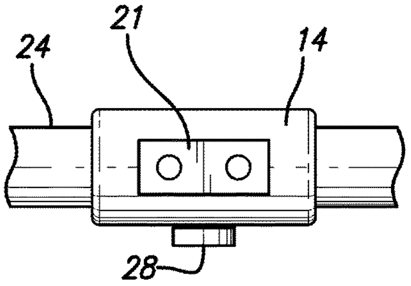
FIG. 2B is a top plan view of the apparatus of FIG. 2A showing the mounting portion on the tool shaft without the handle.
Figure 2C:
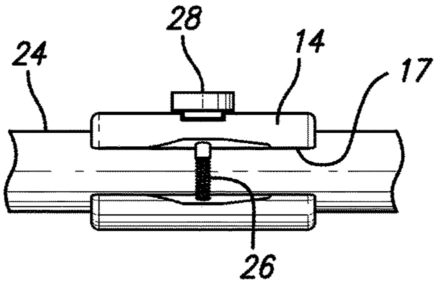
FIG. 2C is a bottom plan view of the apparatus of FIG. 2A showing the mounting portion on the tool shaft without the handle.

Referring to the drawings, an apparatus according to the invention is shown in general at 10. In FIGS. 1 and 2A, the apparatus 10 is shown mounted on a work tool, which has a tool head 22 and a generally straight shaft 24. In accordance with the invention, the apparatus 10 can be part of, or can be mounted onto any object having a shaft, shaft-like part, or like mounting point or part; including a tool (such as a shovel, scoop, rake, or other like implement), a structure (such as a handrail), a device (such as a string trimmer). In some embodiments, the apparatus of the invention can be removable, in that it may be mounted and un-mounted, and may be shared among several objects, tools, structures, and devices. In other embodiments, the apparatus can be non-removable, in that it may be dedicated to a single object, tool, structure, or device. This may be as part of a factory installation or an after-market installation. Whether removable or non-removable, the apparatus can be repositionable, in that while mounted the apparatus can be moved to a different location on the object tool, structure, or device, without having to remove it. Alternatively, if the apparatus is affixed to a single location on an object, tool, structure, or device, it may be considered non-repositionable.

Referring to FIGS. 2A-2F, the apparatus 10 includes a mounting portion 14 with a generally cylindrical bore or opening 15 that is sized for receiving the tool shaft 24. The mounting portion 14 includes an integrated handle mounting block 21 (see FIGS. 2B and 2D) onto which a handle 12 can be mounted. The handle 12 is adapted for gripping by a user 11 of the tool. In the embodiment of FIGS. 2A-2F, the handle 12 includes an elongated portion 13 offset from and disposed generally parallel to and in line with the tool shaft 24.

Also in the embodiment of FIGS. 2A-2F, the cylindrical opening 15 includes an interior surface adapted for allowing the mounting portion 14 to be slidingly moved along a length of the tool shaft 24. Sliding pads 16 are mounted to the interior surface of the opening 15 for this purpose; when the sliding pads 16 contact the tool shaft 24 or similar target object, they enable the apparatus to slide. Also mounted to the interior surface of the opening 15 are brake pads 18, which are frictional components. The brake pads 18, when in contact with the tool shaft 24 or other target object, help to hold the apparatus in place, preventing it from sliding under ordinary conditions. A lengthwise slot or gap 17 in the mounting portion 14 allows for adjusting the size of the opening 15 to accommodate various size tool shafts and to adjust the sliding resistance of the mounting portion 14 on the tool shaft 24. This adjustment is made using a metering mechanism 27, which includes a metering screw 26 with a knob 28. The metering screw 26 is inserted into holes 31, 32 in the mounting portion 14 on either side of the gap 17. On one side of the gap 17, the hole 32 is threaded for receiving a threaded portion of the metering screw 26, and on the other side, the hole 31 is slotted. The slotted hole 31 is useful because, as the diameter of the opening 15 is changed with the tightening of the screw 26, the angle between the shaft of the screw 26 and the to the slotted hole 31 changes. The slotted hole 31 allows the screw 26 to slightly move up and down within the slot so that the screw 26 does not jam and become difficult to turn.

In this configuration, the mounting portion 14 can be held in a fixed position along the length of the work tool shaft 24 when leverage is applied to the handle 12 (such as when the tool is used to pick up a load such as snow or dirt), yet the mounting portion 14 can be easily moved along the tool shaft 24 when the leverage is removed. Thus, while mounted, the apparatus 10 may be easily repositioned by simply sliding it forward and rearward as needed, without the necessity of disengaging and re-engaging a locking mechanism. In addition, the apparatus can be easily removed and shared among several objects, tools, structures, and devices.

Figure 2D:
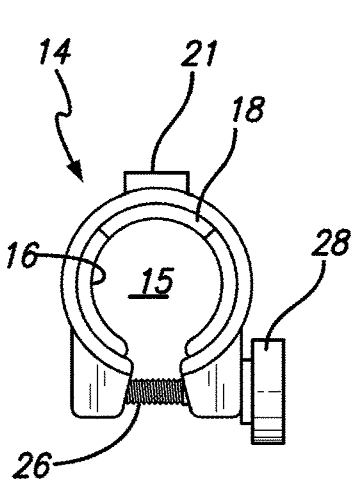
FIG. 2D is an end view of the mounting portion of the apparatus of FIG. 2A showing the metering screw inserted.
Figure 2F:
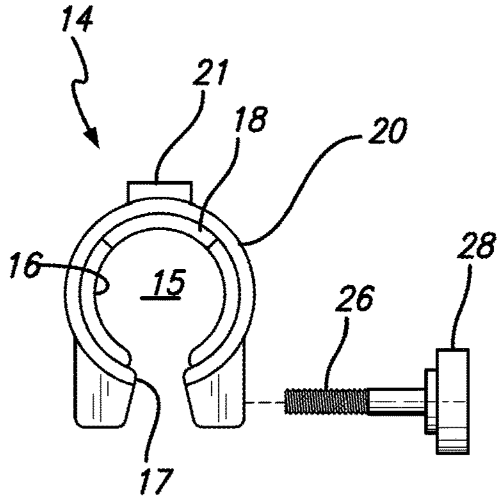
FIG. 2F is an exploded end view of the mounting portion of the apparatus of FIG. 2A showing the metering screw removed.
Figure 2E:
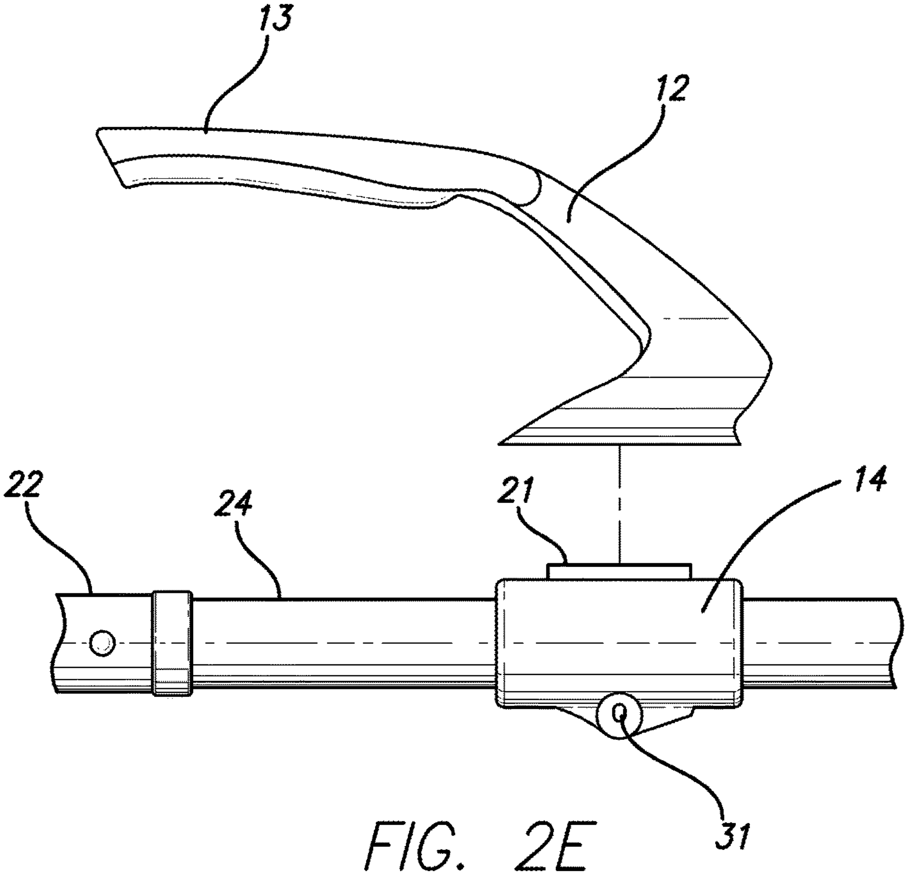
FIG. 2E is an exploded side view of the apparatus of FIG. 2A showing the handle removed from the mounting portion.
Figure 3A:
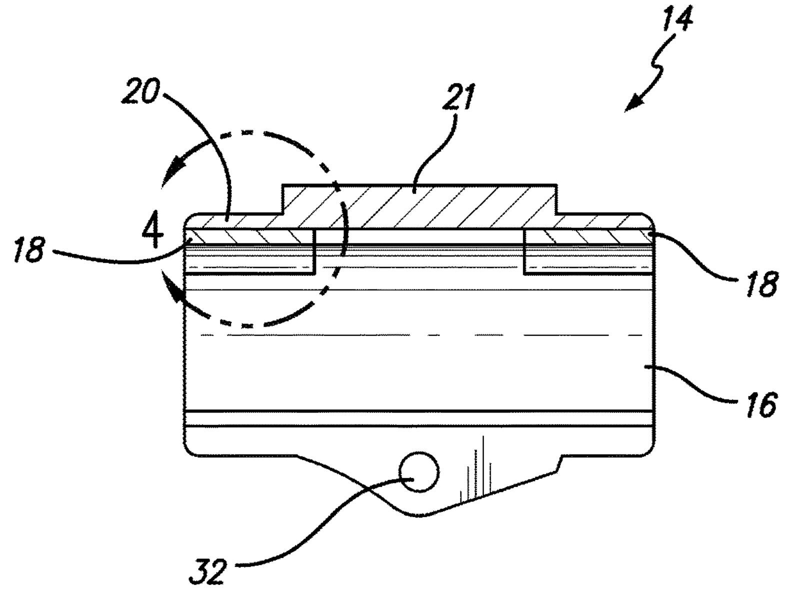
FIG. 3A is a cross-sectional side view of the mounting portion of the apparatus of FIG. 2A showing the interior of the mounting portion, including the sliding pad and brake pads.
Figure 3B:
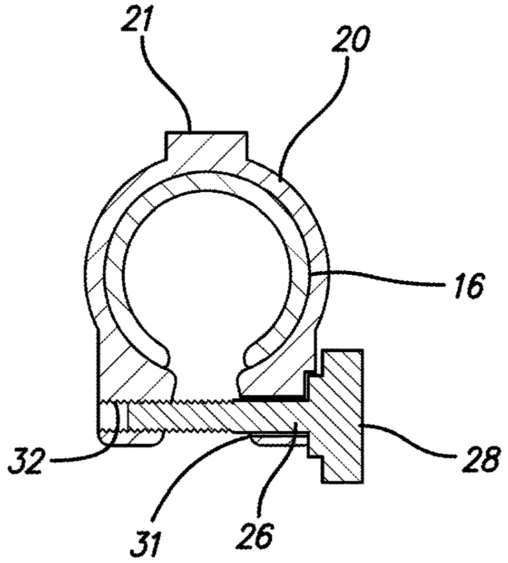
FIG. 3B is a cross-sectional end view of the mounting portion of the apparatus of FIG. 2A showing the sliding pad and metering screw.
Figure 4A:
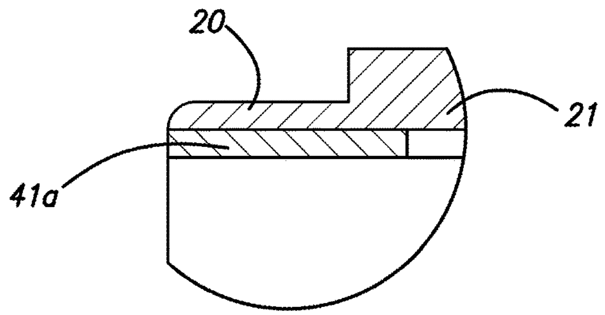
FIG. 4A is an enlarged detail of a portion of FIG. 3A showing a flush mounted brake pad configuration for the mounting portion.
Figure 4B:
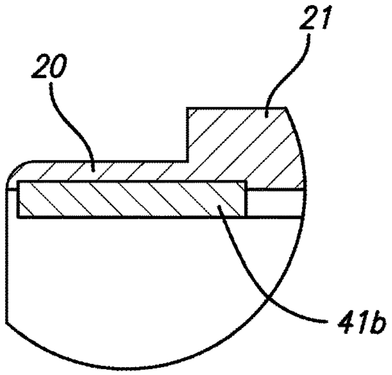
FIG. 4B is an enlarged detail of a portion of FIG. 3A showing a recess mounted brake pad configuration mounting portion.
Figure 4C:
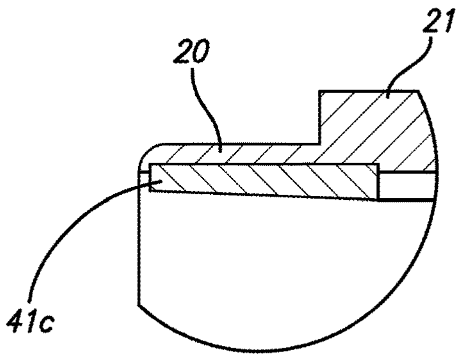
FIG. 4C is an enlarged detail of a portion of FIG. 3A showing an end tapered brake pad configuration mounting portion.
Figure 5:
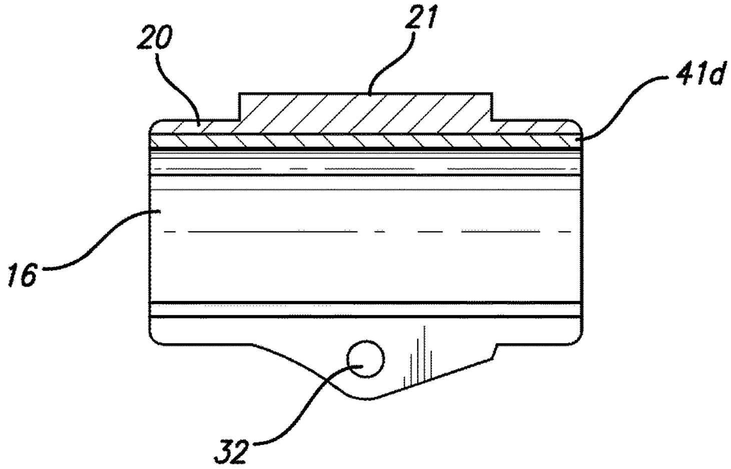
FIG. 5 is a cross-sectional side view of an embodiment of the mounting portion of the apparatus of FIG. 2A that includes a single, full length brake pad.

As can be seen in FIGS. 2D, 2F and 3B, the mounting portion 14 can be in the general form of a cylindrical shell 20, into which other components can be integrated or attached. The shell 20 includes a lengthwise gap 17 along its length, which facilitates the mounting of the apparatus onto a tool shaft or other target object, allows for the cylinder 14 to fit onto shafts/target objects of different sizes and/or diameters, and allows for adjustment of the size of the opening 15 using the metering screw 26. In one advantageous embodiment, the cylinder shell 20 is made of acetal plastic, although many other suitable materials may be used such as other plastics, synthetics, fiberglass, carbon fiber, and/or metals.

Still referring to FIGS. 2D, 2F and 3B, the brake pads 18 and the sliding pads 16 can be secured to the interior surface of the cylindrical shell 20. Alternatively, the interior surface of the cylinder shell 20 can serve as the sliding surface in lieu of a separate sliding pad 16 (see, e.g., FIGS. 7A-7B), provided that the interior surface of the shell 20 possesses the appropriate sliding properties. In some embodiments, the sliding pads 16 are made of velcro loop material or felt material. Other suitable sliding pad materials can include plastics such as: polyethylene, polypropylene, UHMWPE, Teflon and the like.

Figure 8A:
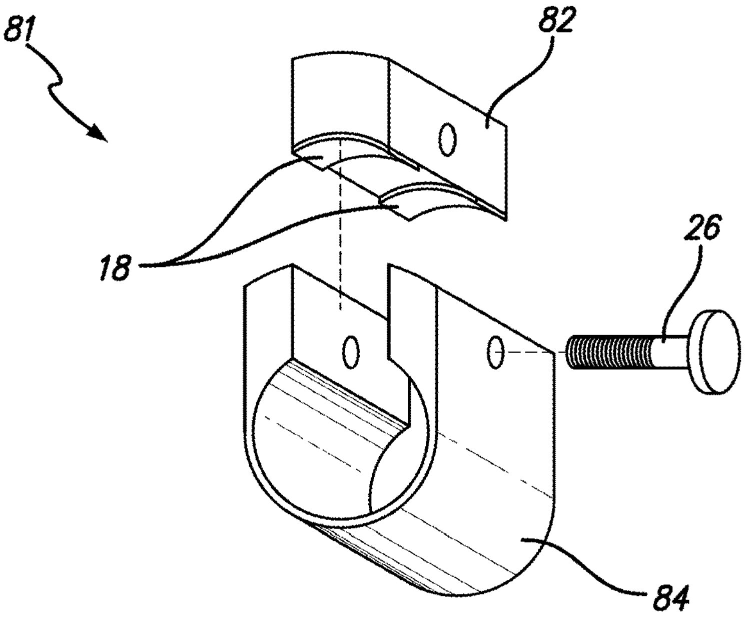
FIG. 8A is an exploded perspective view of another embodiment of the mounting portion of an apparatus according to the invention, which includes a rocker arm of an active braking system.
Figure 8B:
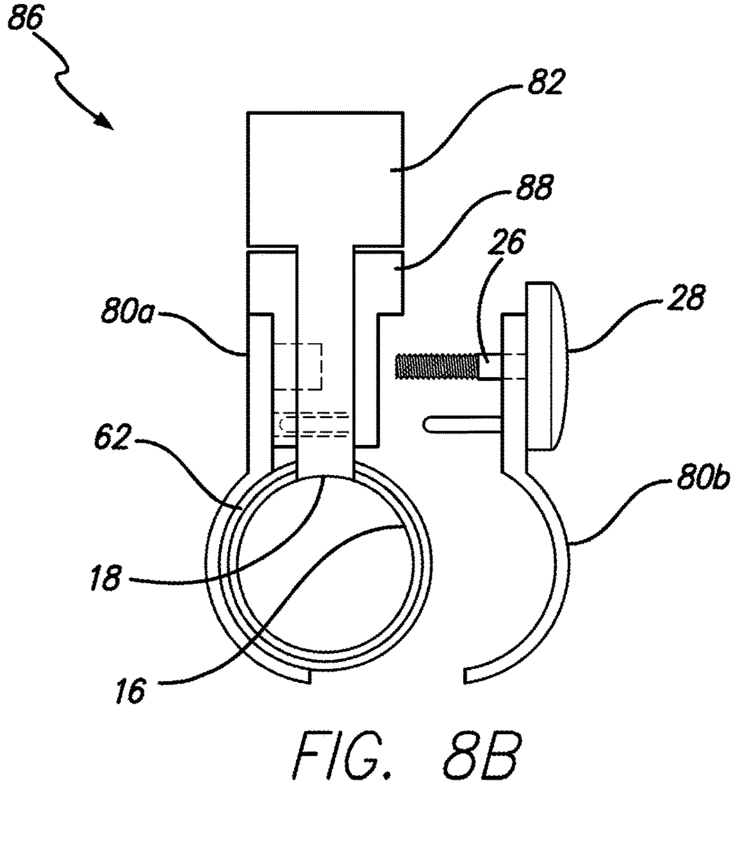
FIG. 8B is an end view of shows another embodiment of the mounting portion of an apparatus according to the invention, which has a clamshell structure.
Figure 9A:
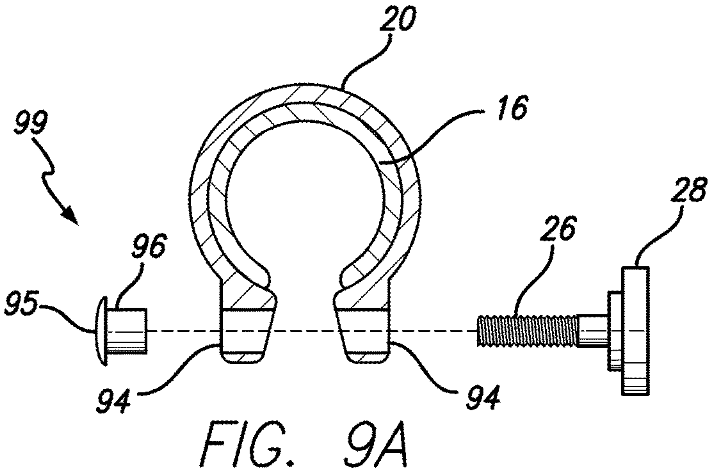
FIG. 9A is an exploded cross-sectional end view showing an embodiment of mounting portion of an apparatus according to the invention, which has a reversible metering screw configuration for adjusting the sliding resistance of cylindrical opening.
Figure 9B:
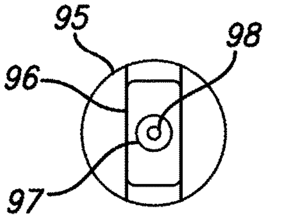
FIG. 9B is an end view of a threaded nut flange of the reversible metering screw configuration of FIG. 9A.
Figure 9C:
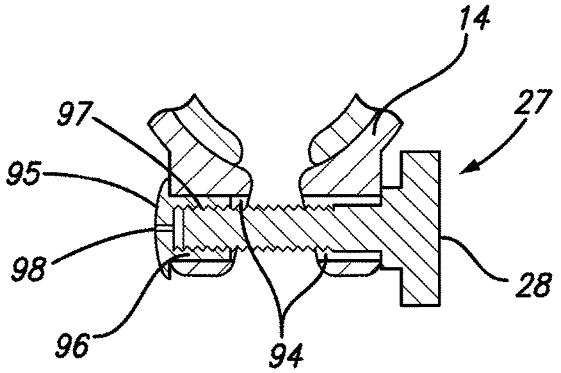
FIG. 9C is a cross-sectional view showing further details of the reversible metering screw configuration of FIG. 9A.
Figure 9D:
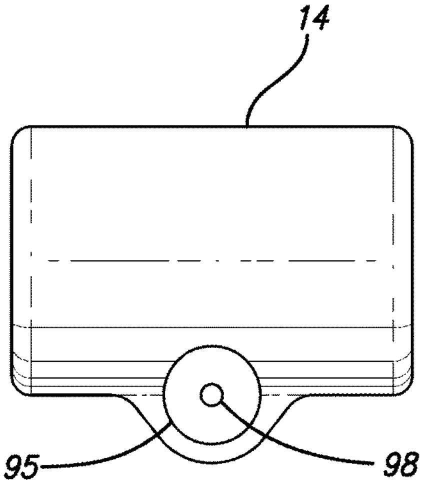
FIG. 9D is a side elevation view of the mounting portion of FIG. 9A with the nut flange inserted.
Figure 9E:
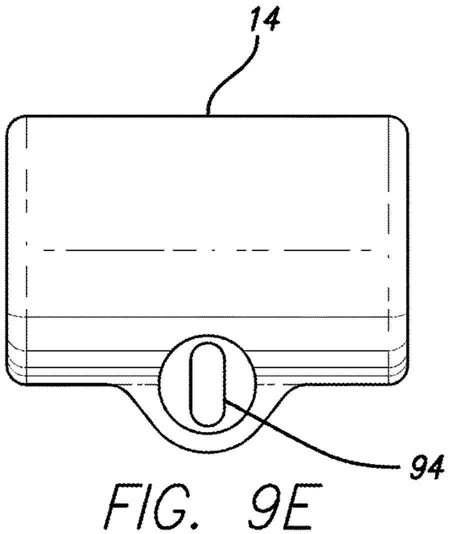
FIG. 9E is a side elevation view of the mounting portion of FIG. 9A with the nut flange removed.

The metering mechanism 27 is a user adjustable mechanism that is used to set the amount of sliding resistance. Additionally, the metering mechanism 27 can help to secure the apparatus 10 to the tool shaft 2, as shown in the embodiments of FIGS. 8A and 8B. In the embodiment of FIGS. 2A-2F and 3A-3B, the metering mechanism 27 includes the metering screw 26, the metering knob 28, the slotted hole 31 and the threaded hole 32. The slotted hole 31 and threaded hole 32 can be integrated with the shell 20. The metering knob 28, which is attached to the head of the metering screw 26, facilitates the manual turning of the screw 26. The portion of the metering screw 26 that is closest to the knob 28 can have a smooth, unthreaded surface. Preferably, the width of the slotted hole 31 is slightly larger than the diameter of the smooth, unthreaded portion of the metering screw 26, thus allowing the metering screw 26 to pass through freely and to slide up and down within the slotted hole 31.

The metering screw 26 is inserted through the slotted hole 31 and into the threaded hole 32, which contains a matching thread on its interior surface in order to receive the metering screw 26. A threaded nut (not shown) can be firmly secured to the shell 20 and can be used instead of a threaded bore 32. In that case, the metering screw 26 is inserted through the slotted hole 31 and through a smooth bore into the threaded nut 32. In either case, tightening of the metering screw 26 results in increased sliding friction of the apparatus; loosening of the metering screw 26 results in decreased sliding friction.

The handle 12 is the structural component of the apparatus that is gripped by the user and coupled to the shell 20. The handle 12 can be permanently attached to or integrated with the shell 20. Alternatively, in some embodiments, the handle 12 can be a separate, removable component that can be mounted and un-mounted from the shell 20, which allows for the use of assorted handle configurations to assist a user in performing specific tasks. This can be facilitated by a handle mounting block 21, which can be attached to, or integrated with the shell 20 and onto which handle 12 can be attached. On one exemplary embodiment, the handle 12 is made of PVC plastic, although many other suitable materials may be used such as: other plastics, synthetics, fiberglass, carbon fiber, and/or metals. Advantageously, PVC provides handle flexibility that allows the apparatus 10 to store and kinetically release energy in manner that can be useful to the user. The handle 12 can flex in a manner similar to that of a leaf spring; storing energy when bent, and upon rebounding, releasing some of that stored energy in the form of work. To the user, this flexing and rebounding of the handle 12 adds a natural and organic feel to the task that when combined with a straightened posture and added mechanical advantage, can be of benefit the user by making the process of working more efficient, less stressful, and less tiring.

FIGS. 12A-12F illustrate various configurations 121-126 for the handle 12 of an apparatus according to the invention, which can be provided to assist the user in performing specific tasks including: lifting, thrusting, pulling, pushing, working in close quarters, working at greater distances, and working with heavy loads. For example, multi-use handle configurations 121, 125 (see, e.g., FIGS. 12A and 12E) can be designed for multiple uses. Handle configuration 125 includes a sliding track mechanism 127 that guides the handle 125 forward and down, and rearward and up. A close-quarters handle configuration 122 provides a smaller offset between the handle and the tool shaft 24. Handle configuration 124 provides a larger offset between the handle and the tool shaft 24. A handrail configuration 126 is adapted for use on a handrail.

According to one aspect of the invention, the apparatus 10 can include braking means for holding the mounting portion 14 in a fixed position along the length of the work tool shaft 24 when leverage is applied to the handle 12 and for allowing the mounting portion 14 to move along the length of the work tool shaft 24 when the leverage is removed. The braking means can include a passive brake system or an active brake system. Although there can be few or no moving parts, a passive brake can work by contacting the surface of the target object (e.g., a tool shaft 24) when the user applies a rotational force (forward or rearward) to the mounting portion 14 via the handle 12. Given that the mounting portion 14 is designed to slide, there is small amount of rotational play in the forward/rearward rotational movement. This rotation allows the brake pad 18 to contact (engage) the target surface when the handle 12 is in use, and permits the brake pad 18 to retract (disengage) when the handle 12 is not in use such as when idle or while the invention is being repositioned by sliding it forward or rearward.

Referring to FIGS. 4A-4C and 5, in a current embodiment with a passive brake, the brake pads 18 are made of a rubber-like material. In various exemplary embodiments, the brake pad 18 can have a flush mounted configuration 41*a* wherein the brake pad 18 is mounted to the interior surface of the cylindrical opening 15. As another example, the brake pad 18 can have a recessed configuration 41*b*, wherein it is mounted in a well within the interior surface of the cylindrical opening 15. As another example, the brake pad 18 can have a tapered configuration 41*c*, wherein it has an end tapered in order to optimize the amount of brake pad surface area that contacts the target object. As yet another example, the brake system can include a single pad configuration 41*d* (which can be the full length of the shell 20) or multiple brake pads 18. As another option, one or more additional bottom brake pads (not shown) also can be secured to or near the bottom of the interior surface of the cylindrical opening 15.

Although various embodiments of the apparatus 10 have been described as having both sliding pads 16 and brake pads 18, some embodiments need not include both. For some uses, an embodiments that have one or more sliding pad 16 and no brake pad 18, or that have one or more brake pads 18 and no sliding pad 16, may be suitable. When the sliding resistance of the apparatus 10 is set properly, much of the holding power (resistance) that keeps the apparatus 10 from slipping along a shaft 24 comes from the sliding pads 16. Even with the brake pads 18 removed, the sliding pads 16 can have sufficient holding power to "brake" most of the time that it is required. When the sliding resistance is set properly, in order for the apparatus to slide along a shaft 24, a force has to be applied that is somewhat parallel to the shaft 24, either forward or rearward. When the apparatus 10 is being used in an operation such as in lifting, most of the force is directed perpendicular to the shaft 24, leaving little of the force in the vector that is parallel to the shaft 24. In this case, the force in the vector that is parallel to the shaft 24 is not enough to overcome the force of the resistance of the sliding pads against the shaft 24; therefore, the apparatus 10 does not slip.

But when a force is applied that is closer to the parallel vector, there may be sufficient force to overcome the resistance of the sliding pads 16 against the shaft 24; the result is that the apparatus 10 may slip. Under circumstances where the sliding pads 16 have insufficient holding power, the brake pads 18 can greatly increase the sliding resistance of the apparatus 10, thus providing improved performance. The brake pads 18 can also, for example: to boost the holding power of the sliding pads 16 at other times; to act as a safety device when the shaft 24 and/or the apparatus 10 are slippery as when exposed to water or oil; or when the metering mechanism 27 is set improperly.

For some uses, an embodiment having only brake pads 18 will slide along a shaft 24 if the sliding resistance of the apparatus is set loosely enough. For such an embodiment, sliding pad material can be replaced with additional brake pad material. The sliding action of such an embodiment may not be as smooth as with an embodiment that includes a sliding pad 16, a configuration having only brake pads 18 can be viable.

Figure 6A:
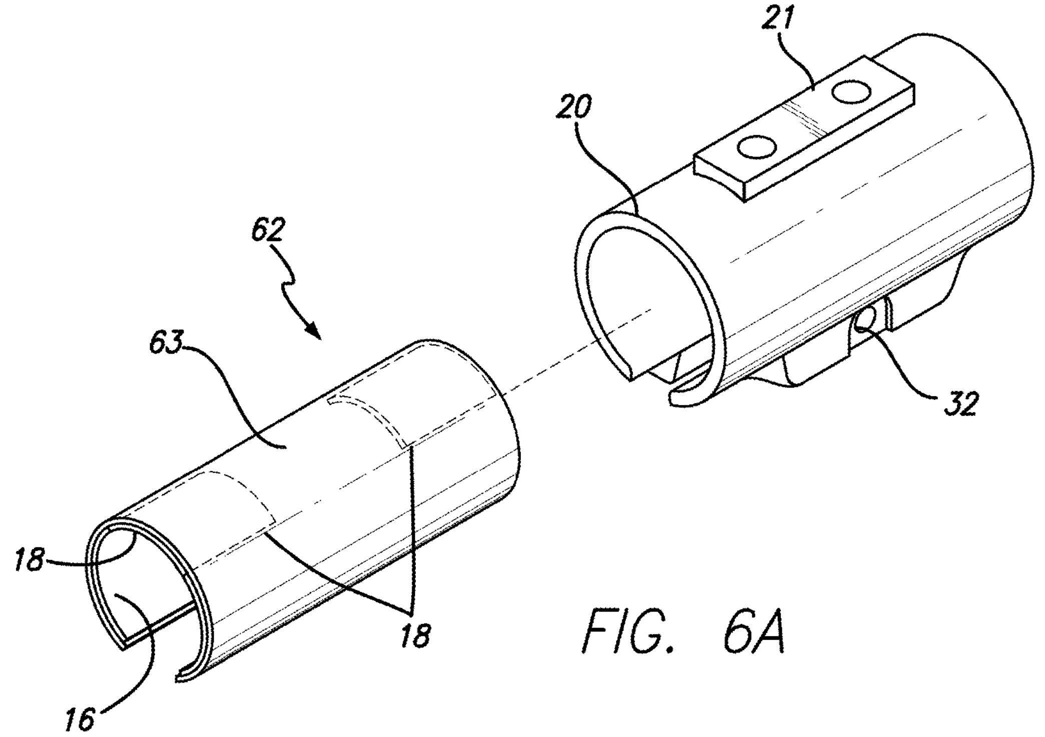
FIG. 6A is an exploded perspective view of an embodiment of the mounting portion of the apparatus of FIG. 2A that includes a sleeve that fits inside the cylindrical opening and that holds one exemplary configuration of a sliding pad and brake pads.
Figure 6B:
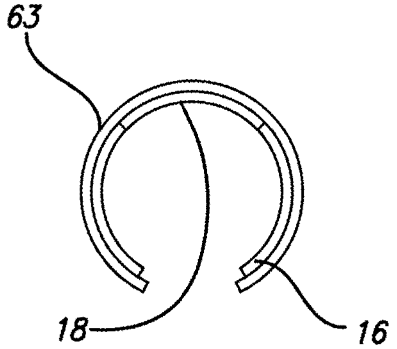
FIG. 6B is an end view of the sleeve of FIG. 6A.
Figure 6C:
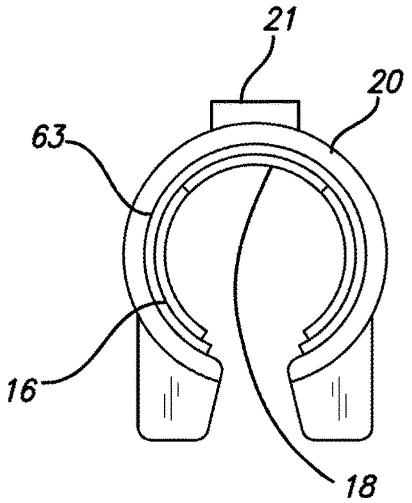
FIG. 6C is an end view of the assembled mounting portion shown in FIG. 6A, including the sleeve inserted into the cylindrical opening.

Referring to FIGS. 6A-6C, in some embodiments, a pad holder assembly 62 is provided, which can be in the form of a removable sleeve or cartridge 63 that holds sliding pads 16, brake pads 18, or both; and which can allow for the easy replacement of the sliding pads 16 and/or brake pads 18. The pad holder cartridge 63 can be held against the interior surface of the shell 20 merely by friction, but can also can have a registration pin (not shown) to ensure that the pad holder assembly 62 will seat properly and will be aligned correctly within the cylindrical shell 20. By utilizing pad holder cartridge 63 of different thicknesses, the apparatus can be mounted on target objects of different sizes and/or diameters. In one advantageous embodiment, the pad holder cartridge 63 is made of a PVC plastic material, although many other suitable materials may be used such as: other plastics, synthetics, fiberglass, carbon fiber, and/or metals.

Figure 7A:
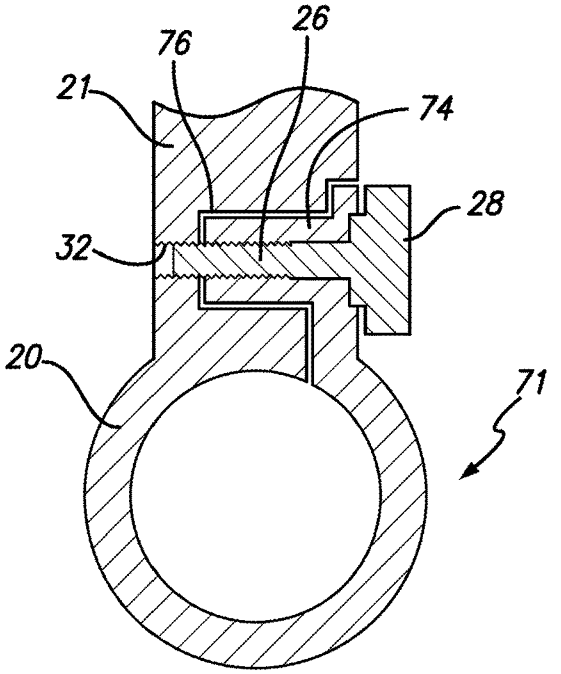
FIG. 7A is a cross-sectional end view showing another embodiment of the mounting portion of an apparatus according to the invention, wherein the metering screw is inserted above the cylindrical opening in the mounting portion.
Figure 7B:
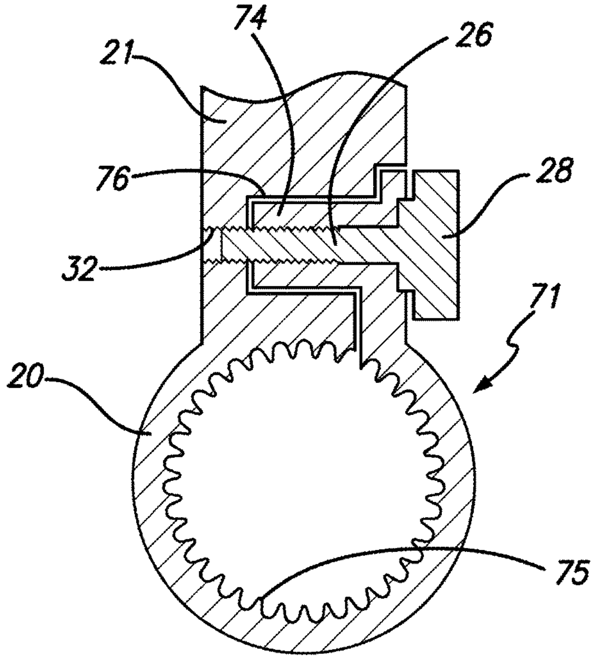
FIG. 7B is a cross-sectional end view of the mounting portion of FIG. 7A showing an alternative sliding pad configuration.

FIGS. 7A and 7B illustrate embodiments of the apparatus 10 that include a top metering screw assembly 71 wherein the metering screw 26 is inserted above the cylindrical opening in the mounting shell 20. Referring to those figures, a side of the mounting shell 20 includes a projection 74 that fits into a corresponding hole 76 in an opposing side of the mounting shell 20. The projection 74 includes a slotted hole for receiving the metering screw 26 and the opposing side of the mounting shell 20 includes a threaded hole 32 for receiving an end portion of the metering screw 26. As the metering screw 26 is screwed into and out of the opposing hole 32, the diameter of the cylindrical opening in the mounting shell 20 is decreased and increased, thereby tightening and loosening the mounting shell 20 around the tool shaft 24. FIG. 7B illustrates an embodiment of the top metering screw assembly 71 that has lengthwise ribs 75 formed along the interior of the cylindrical opening in the mounting shell 20, which provide a surface having characteristics similar to that of a sliding pad, as discussed above.

Figure 10:
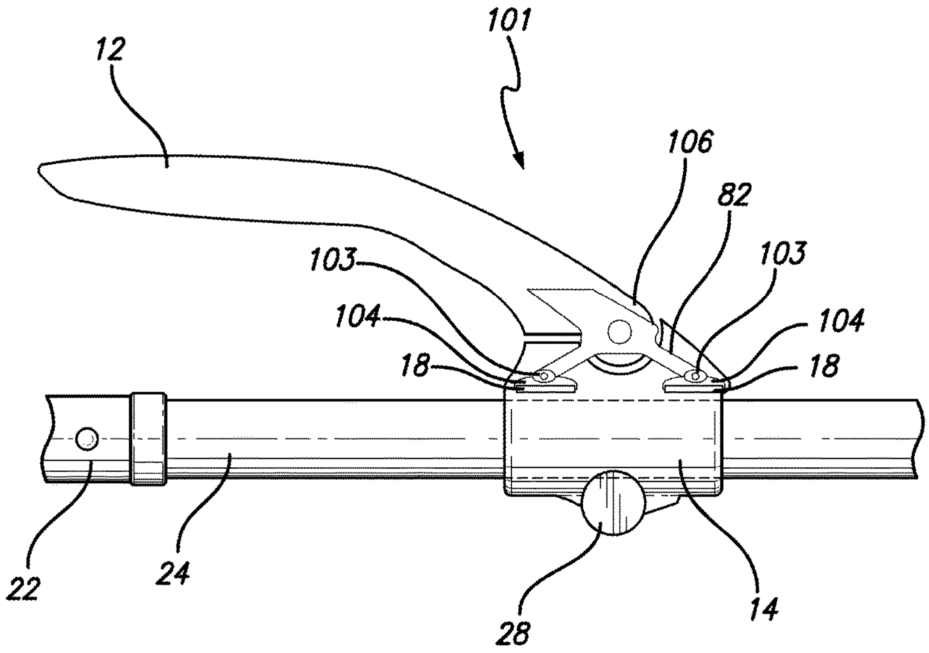
FIG. 10 is a side elevation view of another embodiment of an apparatus according to the present invention, which includes a handle having a sliding configuration.

Referring to FIGS. 8A-8B and 10, in some embodiments, an active brake is provided, which is a braking system with moving parts that can engage and disengage a brake when the user applies a rotational force (forward or rearward) to the handle 12. The brake pads 18 can be directly or indirectly mounted onto a rocker arm 82 that is pivotally attached to the handle 12, and which rotates independently of the mounting portion 14. This rotation allows the brake pad 18 to contact (engage) the tool shaft 24 or other target surface when the handle 12 is in use, and permits the brake pad 24 to retract (disengage) when the handle 12 is not in use such as when idle or while the apparatus 10 is being repositioned by sliding it forward or rearward. In the embodiment of FIG. 8A, the mounting portion 14 includes a rocker assembly 81 that includes the rocker arm 82 pivotally mounted to a mounting shell 84 using the metering screw 26. Brake pads 18 are mounted to the bottom of the rocker are 82 so that they can engage and disengage the tool shaft 24 as the rocker arm is rotated. In the embodiment of FIG. 8B, the mounting portion 14 includes clamshell assembly 86, which includes a rocker arm 82 pivotally mounted to a center body 88 that is held between opposing members 80*a*, 80*b* of a clamshell structure. The clamshell members 80*a*, 80*b* are mounted to the center body 88 by the metering screw 26, which also provides the pivot axis for the rocker arm 82. The lower portions of the clamshell structures 80*a*, 80*b*, form a generally cylindrical opening, which receives a pad holder cartridge 62 that can hold sliding pads 16 and/or brake pads 18 as previously described. In the embodiment of FIG. 10, pivoting brake shoes 104 are each mounted on an axis 103 so that they can pivot in order to optimize the amount of brake pad surface area that contacts the tool shaft 24 or other target object.

Referring to FIGS. 9A-9E, in some embodiments a reversible sliding resistance metering assembly 99 can be provided for adjusting the sliding resistance of the apparatus 10 on a tool shaft 24 or other target object. The reversible metering assembly 99 allows the metering screw 26 to be inserted on either side of the mounting shell 20 in order to accommodate both left-handed and right-handed users. In the exemplary embodiment of FIGS. 9A-9E, two slotted holes 94 of similar size and shape are each located on opposite sides of the shell 20 (left and right). In order to accommodate both left-handed and right-handed users, the metering 26 screw and knob 28 of the metering mechanism 27 can be inserted into either slotted hole 94. A threaded nut 96 includes a flange 95, an internal thread 97 and a vent hole 98. The threaded nut 96 can be pressed into the opposing slotted hole 94 and held in place by friction.

Figure 11A:
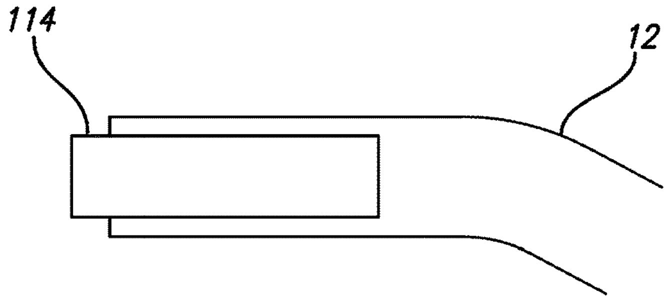
FIG. 11A is a side cutaway view of an embodiment of an apparatus according to the present invention that includes a handle with a flashlight mounted in it.
Figure 11B:
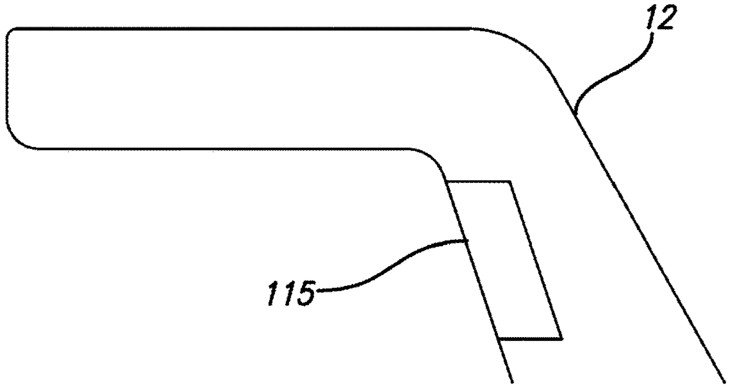
FIG. 11B is a side view of embodiment of an apparatus according to the present invention that includes light source and lens mounted within the base of the handle.
Figure 11C:
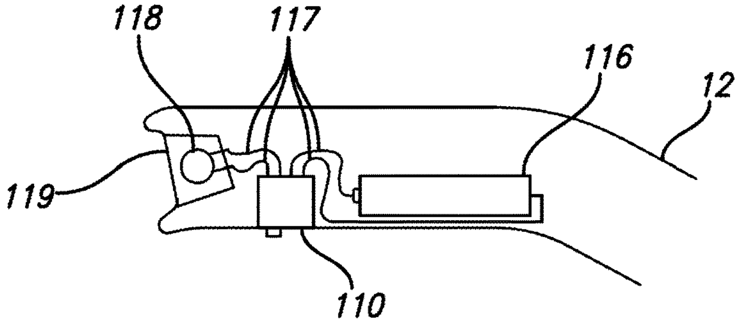
FIG. 11C is a side cutaway view of an embodiment of an apparatus according to the present invention that includes a handle with another configuration of a light source mounted in the handle end.
Figure 12A:
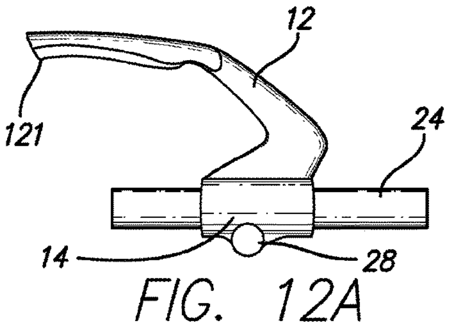
FIGS. 12A-12F shows various configurations for the handle of an apparatus according to the invention.
Figure 12B:
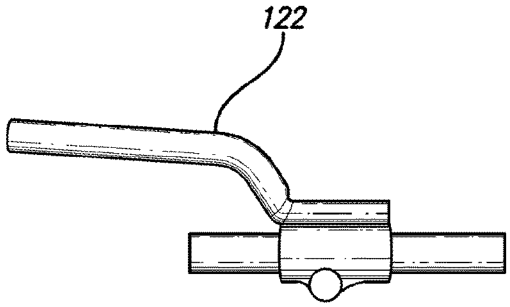
Figure 12C:
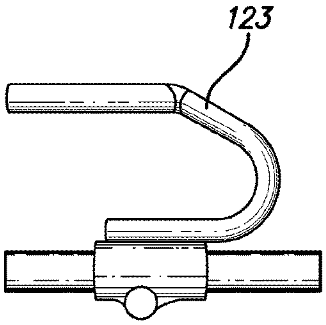
Figure 12D:
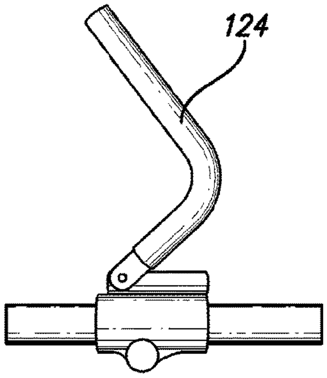
Figure 12E:
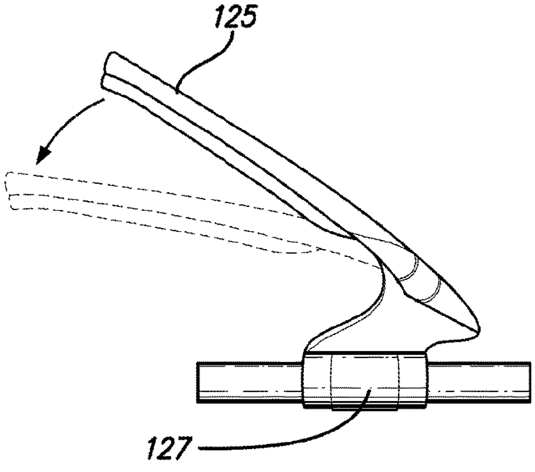
Figure 12F:
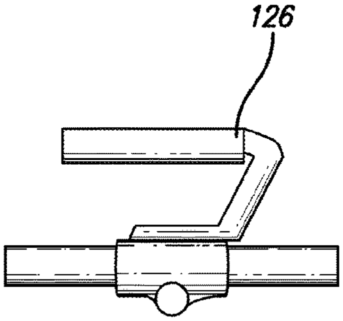

Referring to FIGS. 11A-11C, in some embodiments, the handle 12 includes a light source 118 for illuminating the work area at night or under low lighting conditions. In one exemplary embodiment (see FIG. 11A), the light source 118 is included in a removable flashlight 114, which provides the user with the added benefit of having a flashlight available at hand for other uses. Additionally, the removable flashlight 114 can be easily swapped-out for another flashlight, perhaps one with fresher batteries. In another exemplary embodiment (see FIG. 11B), the light source 118 is included in a lens and light assembly 115 mounted into the handle 12. In another exemplary embodiment (see FIG. 11C), the light source 118 can be mounted in the end of the handle 12. As shown in FIG. 11C, all of the light assembly components, including a lens 119, switch 110, a battery 116 and wiring 117 can be mounted in the handle 12.

Figure 13:
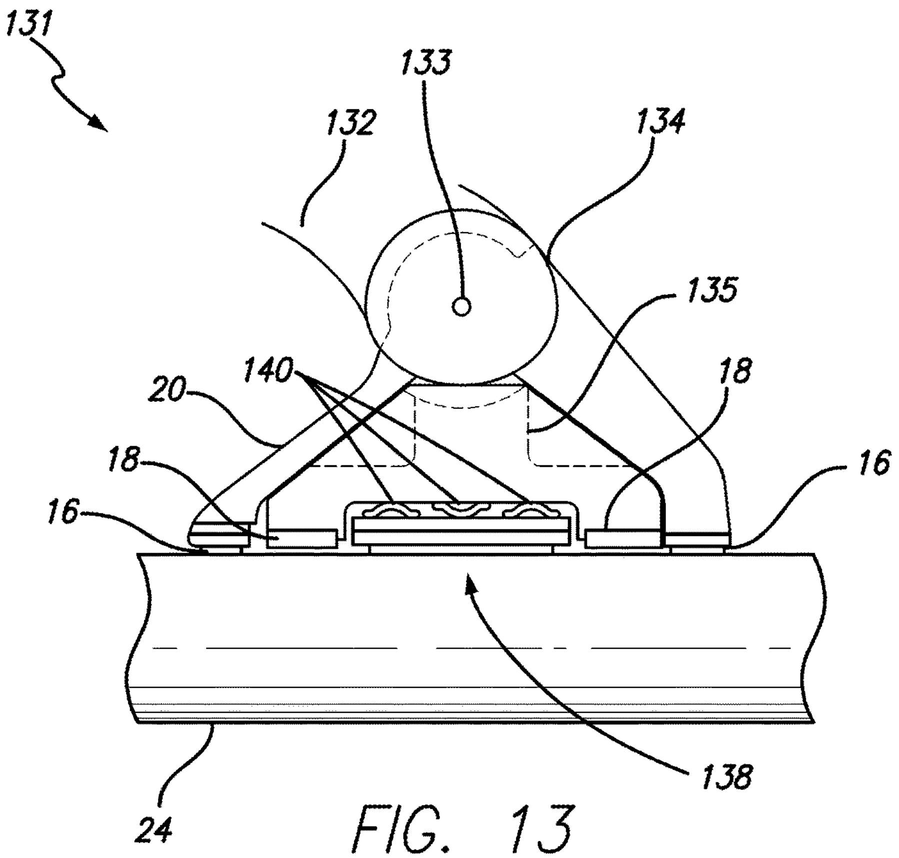
FIG. 13 shows is a side elevation view of a portion of an embodiment of an apparatus according to the present invention that includes a cam wheel configuration for an active brake.

FIG. 13 illustrates an embodiment of the apparatus 10 that includes a cam wheel brake assembly 131, which functions as an active brake. In this configuration, the brake pads 18 are attached to a lifter 135 that is slightly retracted from the surface of the tool shaft 24 or other target object. The lifter 135 sits within the mounting shell 20. The lifter 135 rides on a cam wheel 134 that is pivotally attached to the mounting portion 14 and/or handle base 132 and pivots on an axis 133. The brake pads 18 can be located on a bottom surface of the lifter 135 at the outer ends, at the center, or along the length of the lifter. An optional center sliding pad assembly 138 can be located at the middle of the lifter 135 and includes one or more sliding pads 16 on its lower surface. Springs 140, such as Belleville-type compression springs or similar springs, can be located between, and may be attached to both the lifter 135 and the center sliding pad assembly 138.

Still referring to FIG. 13, as a rotational force is applied to the handle 12, the cam wheel 134 rotates and pushes the lifter 135 onto the surface of the shaft 24 or target object, thereby holding the apparatus 10 in place on the shaft 24. The lifter 135 also pushes onto the springs 140, which pushes the center sliding pad against the surface of the shaft 24. This further helps to hold the apparatus 10 in place. When the rotation is released, the compression springs 140, push the lifter assembly 135 back to its retracted position.

Figure 14:
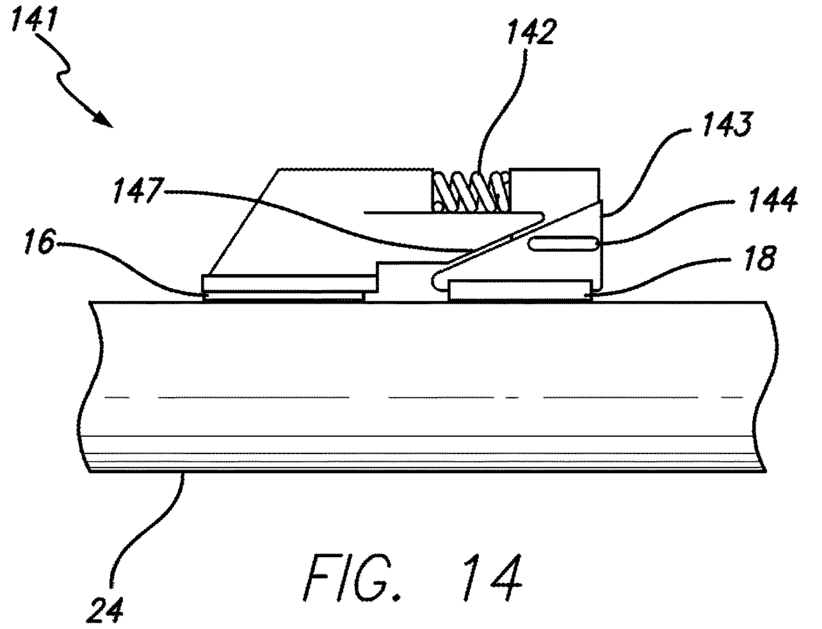
FIG. 14 shows a side elevation view of a portion of an embodiment of an apparatus according to the present invention that includes wedge brake configuration of an active brake.

FIG. 14 illustrates an embodiment of an apparatus 10 that includes wedge brake assembly 141, which functions as an active brake that engages when the user applies a rotational force (forward or rearward) to the mounting shell 20 via the handle 12. In this configuration, the brake pads 18 are attached to a wedge-shaped brake pad holder 143 that is slightly retracted from the surface of the tool shaft 24 or other target object. The wedge-shaped brake pad holder 143 can include a groove 144, which allows the holder 143 to be mounted onto and slide over a rail, pin, or similar structure that is part of the mounting shell 20. In this configuration, the wedge-shaped brake pad holder 143 can move forward and rearward, upward and downward, and rotate forward and rearward within the mounting shell 20. Alternatively, the groove can be part of the mounting shell 20, while the rail, pin, or similar structure can be part of the wedge-shaped brake pad holder 143. Stops located at the ends of the groove 144 can be used to limit the travel range of the wedge-shaped brake pad holder 143 within the mounting shell 20.

Still referring to FIG. 14, as a rotational force is applied to the mounting shell 20 via the handle 12, the brake pad 18 contacts the shaft 24, holding the wedge-shaped brake pad holder 143 in place. As the mounting shell 20 is pulled slightly rearward, an opposing wedge-shaped projection 147 connected to the mounting shell 20 rides over the wedge-shaped brake pad holder 143, wedging the brake pad 18 and holding shell 20 in place. When the rotation is released, the force of the opposing wedge-shaped projection 147 onto the wedge-shaped brake pad holder 143 is reduced to the point that the brake pad 18 is no longer wedged in place. The wedge-shaped brake pad holder 143 can slide back to its retracted position, which may be assisted by an optional spring 142, such as a compression spring, leaf spring, or similar device, or by two magnets (not shown) configured to repel each other.

Figure 15:
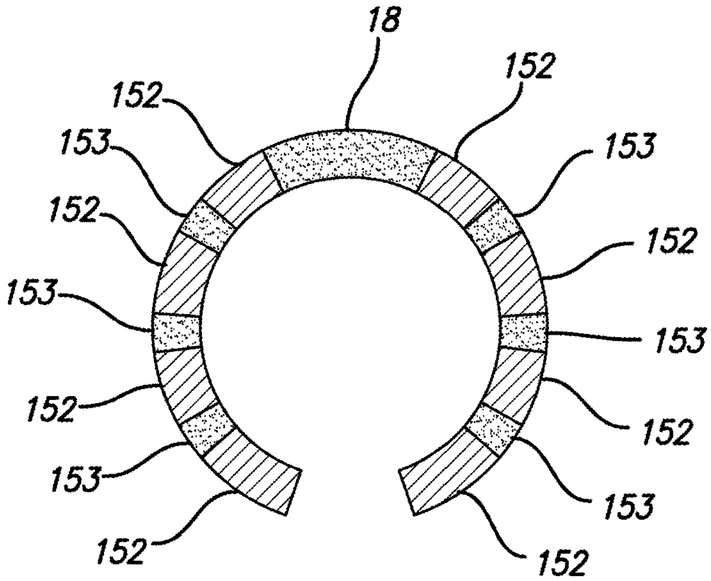
FIG. 15 is a cross-sectional end view showing exemplary placement of a brake pads, sliding pad strips and anti-roll strips within a cylindrical opening of an anti-rolling embodiment of an apparatus according to the present invention.
Figure 16:
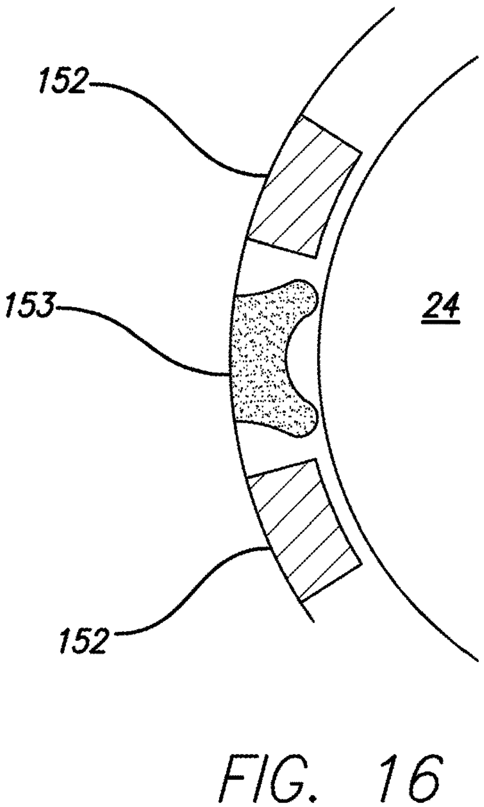
FIG. 16 is an enlarged view showing further detail of the embodiment of FIG. 15.

FIGS. 15 and 16 illustrate an exemplary an embodiment of the invention with an anti-roll is a feature that may help to prevent or minimize torquing or rolling of the tool shaft 24 or other target object within the mounting shell 20. Under normal circumstances, the brake pads 18 can provide sufficient holding power to prevent or minimize torquing and/or rolling of the tool shaft 18, but there may be situations that may benefit from additional holding power, such as a shovel bed having a heavy load, or an unbalanced load in which a one-sided load or a top-heavy load or both may be difficult for the user to control. Referring to FIGS. 15 and 16, one or more brake pads 18, sliding pad strips 152 and anti-roll strips 153 are disposed within a cylindrical opening 25 of the mounting shell 20. In the exemplary embodiment of FIGS. 15 and 16, the anti-roll strips 153 are be made of a material similar to that used for the brake pads 18 and are disposed lengthwise within the cylindrical opening 15 of the mounting shell 20 with alternating sliding pad strips 152. The anti-roll strips 153 can be slightly retracted from the surface of the tool shaft 24. As a rotational force is applied to the mounting shell 20 via the handle 12, the brake pads 18 and anti-roll strips 153 contact the tool shaft 24, holding the apparatus 10 in place and offering greater resistance to torquing and/or rolling.

Upon reading this specification, it will be understood that the apparatus of the present invention provides a number of advantages. The apparatus can provide a convenient handhold for maneuvering any object including a tool or device, and for lifting, pulling, or pushing against a structure including a handrail or any like apparatus. It encourages the ergonomic positioning and use of the human body. When mounted onto the shaft of an object such as a shovel, the apparatus affords a user with the opportunity to stand more upright while using that tool by providing a convenient handhold which is offset from the shaft of that tool; and which can be easily repositioned to suit the particular requirements of the user; such as adjusting for the user's height and arm length. This can reduce the amount of bending and twisting, allowing the user to work in a more efficient and ergonomic manner. By strategic positioning of the handle, the apparatus can increase mechanical advantage, thus leveraging greater loads for tasks that may include lifting and any other maneuvers.

It will also be understood by those having skill in the art that modifications may be made to the invention without departing from its spirit and scope. Therefore, the invention in its broader aspects is not limited to the specific details, representative devices, and illustrative examples shown and described. Accordingly, departures may be made from such details without departing from the spirit or scope of the general inventive concept.

What is claimed is:

1. A sliding auxiliary handle for a work tool, the sliding auxiliary handle comprising:
- a mounting portion comprising a substantially cylindrical opening that is configured to receive a work tool shaft therethrough;
- a handle coupled to the mounting portion, the handle comprising an elongated grip portion;
- one or more sliding pads within the substantially cylindrical opening of the mounting portion; and
- one or more brake pads within the substantially cylindrical opening of the mounting portion and positioned proximal the handle, the one or more brake pads comprising a material having a higher coefficient of friction than a coefficient of friction of a material comprising the one or more sliding pads and wherein at least one of the one or more sliding pads is positioned at about 90 degrees of arc from a position of at least one of the one or more brake pads within the substantially cylindrical opening of the mounting portion;
- wherein the one or more brake pads are configured to hold the work tool shaft at a fixed position when leverage is applied to a distal end of the work tool and the one or more sliding pads are configured to facilitate sliding the mounting portion along the work tool shaft when no leverage is applied to the distal end of the work tool without engaging or disengaging a locking mechanism.

2. The sliding auxiliary handle of claim 1, wherein the elongated grip portion of the handle is substantially parallel to the work tool shaft when the work tool shaft is located within the substantially cylindrical opening of the mounting portion.

3. The sliding auxiliary handle of claim 1, further comprising a metering mechanism configured to adjust sliding resistance.

4. The sliding auxiliary handle of claim 3, wherein the metering mechanism further comprises a metering screw.

5. The sliding auxiliary handle of claim 1, wherein the one or more sliding pads is comprised of at least one of a hook and loop closure material, a felt material, polyethylene, and polypropylene.

6. The sliding auxiliary handle of claim 1, wherein the elongated grip portion of the handle is adjustable such that an angle between the elongated grip portion and the work tool shaft is adjustable.

7. The sliding auxiliary handle of claim 6, wherein the mounting portion further comprises a sliding track configured to allow the elongated grip portion to change positions.

8. The sliding auxiliary handle of claim 1, wherein the handle is detachable from the mounting portion.

9. The sliding auxiliary handle of claim 1, further comprising a light source coupled to the handle.

10. A sliding auxiliary handle for a work tool, the sliding auxiliary handle comprising:
- a mounting portion comprising a substantially cylindrical opening that is configured to receive a work tool shaft therethrough;
- a handle coupled to the mounting portion, the handle comprising an elongated grip portion; and
- one or more brake pads within the substantially cylindrical opening of the mounting portion and positioned proximal the handle;
- wherein the one or more brake pads are configured to hold the work tool shaft at a fixed position when leverage is applied to a distal end of the work tool and one or more sliding pads on an interior surface of the substantially cylindrical opening of the mounting portion is comprised of a material having a lower coefficient of friction than a material comprising the one or more brake pads and is configured to facilitate sliding the mounting portion along the work tool shaft when no leverage is applied to the distal end of the work tool without engaging or disengaging a locking mechanism.

11. The sliding auxiliary handle of claim 10, wherein the elongated grip portion of the handle is substantially parallel to the work tool shaft when the work tool shaft is located within the substantially cylindrical opening of the mounting portion.

12. The sliding auxiliary handle of claim 10, further comprising a metering mechanism configured to adjust sliding resistance.

13. The sliding auxiliary handle of claim 12, wherein the metering mechanism further comprises a metering screw.

14. The sliding auxiliary handle of claim 10, wherein handle is comprised of at least one of a plastic, a synthetic, a fiberglass, a carbon fiber, and a metal.

15. The sliding auxiliary handle of claim 10, wherein the elongated grip portion of the handle is adjustable such that an angle between the elongated grip portion and the work tool shaft is adjustable.

16. The sliding auxiliary handle of claim 15, wherein the mounting portion further comprises a sliding track configured to allow the elongated grip portion to change positions.

17. The sliding auxiliary handle of claim 10, wherein the handle is detachable from the mounting portion.

18. The sliding auxiliary handle of claim 10, further comprising a light source coupled to the handle.

19. The sliding auxiliary handle of claim 10, wherein the one or more sliding pads is comprised of at least one of a hook and loop closure material, a felt material, polyethylene, and polypropylene.

20. The sliding auxiliary handle of claim 10, wherein the one or more brake pads and one or more sliding pads are positioned within a removable sleeve.

* * * * *